United States Patent [19]
Vilkomerson

[11] Patent Number: 5,540,230
[45] Date of Patent: Jul. 30, 1996

[54] DIFFRACTING DOPPLER-TRANSDUCER

[75] Inventor: David Vilkomerson, Princeton, N.J.

[73] Assignee: Echocath, Inc., Monmouth Junction, N.J.

[21] Appl. No.: 328,067

[22] Filed: Oct. 24, 1994

Related U.S. Application Data

[63] Continuation-in-part of Ser. No. 228,578, Apr. 15, 1994, Pat. No. 5,488,953.

[51] Int. Cl.$^6$ .................................. A61B 8/06; G01F 1/66
[52] U.S. Cl. ................................. 188/662.04; 73/861.25
[58] Field of Search .................. 128/660.07, 661.01, 128/661.07–661.10, 662.03–662.04, 662.06; 73/861.25; 310/334–335

[56] References Cited

U.S. PATENT DOCUMENTS

| | | | |
|---|---|---|---|
| 4,075,516 | 2/1978 | Hattori et al. | 310/334 |
| 4,142,412 | 3/1979 | McLeod et al. | 128/662.06 |
| 4,375,767 | 3/1983 | Magori | 73/861.18 |
| 5,105,814 | 4/1992 | Drukarey et al. | 128/660 |
| 5,295,487 | 3/1994 | Saitoh et al | 128/662.03 |
| 5,305,758 | 4/1994 | Dietz et al. | 128/662.06 |

OTHER PUBLICATIONS

Atkinson and Woodcock, *Doppler Ultrasound and Its Use in Clinical Measurement*, Academic Press, London (1982).
Hoeks et al., "Comparison of the Performance of the RF Cross–Correlation and Doppler Auto–Correlation Techniques to Establish the Mean Velocity", in *Ultrasound in Medicine and Biology*, p. 727 (1993).
L. Kinsler, et al., *Fundamentals of Acoustics*, John Wiley & Sons (3rd ed. 1982).
Overbeck et al., "Vector Doppler: Accurate Measurement of Blood Velocity in Two Dimensions", *Ultrasound in Medicine and Biology*, vol. 18, p. 19 (1992).
Born & Wolf, *Principles of Optics*, pp. 401–414, Pergamon Press. Oxford (3rd. ed. 1964).
Brown L., "Piezoelectric Polymer Ultrasound Transducers for Nondestructive Testing", Proceedings of ASNT Fall Conference, Valley Forge, PA, Oct. 9–13, 1989.
Drukarey et al., "*Beam Transformation Techniques*", IEEE Trans. Ult., Ferro, and Freq. 40, p. 717 (1993).
K. Katakura et al., "*Underwater Acoustic Imaging by Frequency Controlled Beam Scanning*" Nihon Onkyo Gakkaishi, 1975 31(12) 716–724.
"Underwater Acoustic Imaging by Frequency Controlled Beam Scanning", by K. Katakura et al., in Nihon Onkyo Gakkaishi, 1975 31 (12) 716–724.

*Primary Examiner*—Francis Jaworski
*Attorney, Agent, or Firm*—Plevy & Associates

[57] ABSTRACT

An ultrasonic transducer apparatus of variable frequency including a diffracting structure adapted for emitting and receiving a plurality of diffracted ultrasonic beams of calculable different angles for determining the velocity of a fluid flowing through a lumen, and flow volume. Velocity and flow volume are determined from at least two equations in the two unknowns of the velocity, and the angle between the ultrasonic transducer apparatus and the direction of the fluid flow, and from a determination of the diameter of the lumen.

13 Claims, 9 Drawing Sheets

DIFFRACTING DOPPLER-TRANSDUCER

RELATED APPLICATIONS

This application is a continuation-in-part of U.S. Pat. application Ser. No. 08/228,578 filed Apr. 15, 1994 and now U.S. Pat. No. 5,488,953, and also entitled DIFFRACTING DOPPLER-TRANSDUCER.

FIELD OF THE INVENTION

The present invention relates to ultrasonic transducers and more particularly to a special ultrasonic transducer employing diffraction to produce multiple beams that, using Doppler measurement techniques, can determine the velocity of a fluid flowing through a vessel independently of the transducer orientation.

BACKGROUND OF THE INVENTION

There exists in medicine an important and continuing need to be able to determine the velocity of a fluid under investigation, particularly blood, which flows through a vessel or through connected instrumentation. Conventional ultrasonic transducers employing Doppler measurement techniques are commonly used for this purpose. See Atkinson and Woodcock, *Doppler Ultrasound and Its Use In Clinical Measurement*, Academic Press, London (1982). "Doppler" is used here in the broad sense to describe all the techniques for measuring the variation with time of backscattered ultrasound along a beam to determine the velocity component along the beam. These methods include what is conventionally considered Doppler—i.e., the change in phase of backscattered ultrasound as a result of movement—as well as newer time-domain methods that use cross-correlation to determine the velocity along the beam, See Hoeks et al, "Comparison of the Performance of the RF Cross-Correlation and Doppler Auto-Correlation Technique to Establish the Mean Velocity", in *Ultrasound in Medicine and Biology* 19, page 727 (1993). All such methods measure the velocity component along the beam. To determine true fluid velocity, which is the subject of this invention, requires the correction for angle between the beam and the velocity vector. The results for cross-correlation methods, as well as for the Doppler methods, will depend upon the frequency in use. As will be shown, the angle of the beam from the transducer structure disclosed will also vary with the frequency used. For all such methods, one can obtain two equations, relating the measured effects of changing frequency in terms of the observed velocity and angle, and then determine both velocity and angle between the measuring ultrasound beam and the velocity vector. For ease of use herein, reference to the term "Doppler" will signify reference to all methods that use time variation of the backscattered ultrasound along a beam to measure the velocity of a fluid at an unknown angle to the beam.

Ultrasonic transducers are devices which convert energy between electrical and acoustic forms. See L. Kinsler et al., *Fundamentals of Acoustics*, John Wiley & Sons (3d ed. 1982). By directing an insonifying beam of ultrasonic energy towards a fluid under investigation at a known angle, and by then measuring the frequency shift of the backscattered ultrasound energy, the velocity of the fluid under investigation can be determined. This is because the Doppler shift in frequency is proportional to the component of the velocity vector that is parallel to the insonifying beam. The well-known equation for finding the velocity v of the fluid from the Doppler shift frequency $f_d$ is $$v = .5 \cdot f_d \frac{c}{f \cdot \cos \theta} \tag{1}$$

where c is the velocity of sound in blood, f is the frequency of the insonifying beam and $\theta$ is the angle between the insonifying beam and velocity vector.

A problem commonly encountered when employing conventional Doppler techniques to measure the velocity v of a fluid under investigation is that typically the insonifying beam insonifies the fluid flow at an unknown angle. Without knowledge of the angle, equation (1) cannot be solved. Therefore, in such situations, employing a single insonifying beam to determine the velocity of the fluid of interest from equation (1) is impossible since there are two unknowns in the single equation (1), the velocity v and the angle $\theta$.

One method of eliminating the foregoing problem of determining the angle $\theta$ in question has been to employ two transducers at a known angular offset of $\pm\alpha$ and to insonify the fluid under investigation at the respective angles of $\theta+\alpha$ and $\theta-\alpha$, thus allowing the two following equations (2) in the two unknowns v and $\theta$ to be written, and by solution of two equations in two unknowns, permitting v to be determined regardless of the value of $\theta$:

$$v = .5 \cdot f_{d1} \frac{c}{f \cdot \cos(\theta + \alpha)} \tag{2}$$

$$v = .5 \cdot f_{d2} \frac{c}{f \cdot \cos(\theta - \alpha)}$$

see Overbeck et al, "Vector Doppler: Accurate Measurement of Blood Velocity in Two Dimensions", *Ultrasound in Medicine and Biology*, Volume 18, page 19 [1992]). However, using two conventional transducers at two angles to the fluid flow is difficult, as transducers are thick, inflexible, bulky, difficult to implant, and too big to be useful on a catheter or a guidewire. Thus, use of pairs of transducers, while possible, is rare.

Conventional phased-array ultrasound transducers used for diagnostic imaging are all essentially configured as an array of linear elements. A major problem with these conventional transducers is their complexity—as shown in FIG. 1, each of the linear transducers that compose the array has its own connection and driver. These are necessary for the phase adjustment needed to focus and steer the beam the array produces. In the case of what is known in the art as a linear array, only certain groups of elements at a time are connected in parallel; these elements act as one uniform transducer and produce one beam, which is scanned by changing which group of array elements are connected. Operationally, conventional phased array and linear array transducers suffer the drawback of requiring many signal cables to operate, either to connect to each element or to connect to groups of elements.

Most conventional phased array ultrasound transducers operate by generating a single beam which is scanned over an angular sector of beam positions. Reflections are obtained at a multitude of beam locations to determine velocity of a fluid being targeted. Other imaging systems are presently available which operate by generating multiple beams from a phased array transducer, by using superposition of the driving patterns for each beam. For example, U.S. Pat. No. 5,105,814 discloses a method of transforming a multi-beam ultrasonic image in which a plurality of ultrasonic beams are simultaneously transmitted into an object. This method does not employ a Doppler measurement technique to arrive at a velocity of a fluid. Moreover, these multibeam systems also suffer from the problem of requiring a multitude of transducer elements, phase delays, and cables, resulting in a complex and bulky configuration.

Diffraction is well-known in optics as a way to produce multiple optical beams based on the interference effects of waves. Likewise, it is conceivable to use diffraction principles in ultrasound as a way to produce multiple ultrasonic beams for performing Doppler measurements of the velocity of blood or other fluids. The conventional phased-array ultrasound transducer configuration of an array of linear elements may appear similar to the appearance of a diffracting structure (of which the present invention relates to). However, these conventional transducers operate based on a totally different principle as compared to the diffraction principle of the present invention.

It is therefore an object of the present invention to provide a single transducer that is able to produce multiple insonifying beams at known and controllable angles by employing diffraction principles, thus permitting the absolute velocity of a fluid under investigation to be determined using Doppler measurement techniques.

It is a further object of the present invention to provide such a transducer which is thin, flexible and easy to implant, and which eliminates the need for multiple cables and elements as required by the prior art.

SUMMARY OF THE INVENTION

An ultrasonic transducer apparatus of fixed or variable frequency including a diffracting structure adapted for emitting and receiving a plurality of diffracted ultrasonic beams at known angles for determining the velocity of a fluid flowing through a lumen of a given diameter by providing at least two equations in the two unknowns of the velocity and the angle between the ultrasonic transducer apparatus and the direction of the fluid flow. The diffracting structure also being adapted, by varying the excitation of the ultrasonic transducer apparatus, to emit and receive a non-diffracted ultrasonic beam for measuring the diameter of the lumen and thus determining the absolute flow volume of the fluid flowing through the lumen.

Preferably, the transducer apparatus is constructed from a piezoelectric planar member with two major surfaces opposite one another. A continuous ground plane is formed on one of the major surfaces. A grid of electrodes is formed on the other major surface. Each electrode is disposed on a selectively polarized portion of the planar member.

According to another aspect of the present invention, the transducer apparatus is adapted to emit a single ultrasonic beam in a first predetermined direction, followed sequentially by another single ultrasonic beam in a second predetermined direction. The second direction may be obtained either by utilizing a different frequency for the second beam, or by phasing elements of the transducer apparatus in a different manner compared to the inter-element phasing employed to generate the first beam.

DETAILED DESCRIPTION OF THE INVENTION

The present invention relates to an apparatus and a method of producing multiple beams from a single transducer at known and controllable angles to each other and to the transducer. The method uses diffraction, an effect that is based on the interference effects of waves. By using these multiple beams at known angles, Doppler measurements of blood (or other back-scattering fluids) can be obtained independently of the angle between the transducer and the velocity vector of the fluid.

As an example of diffraction, if an absorbing comb-like structure is placed in the propagation path of a plane-wave producing transducer (which could be piezoelectric, magnetostrictive, or electromechanical in operation), multiple beams will appear above the structure. In optical diffraction, one would use what is well known as a "diffraction grating" to produce the multiple beams. The present invention, however, relates to the use of multiple beams of ultrasound energy. These beams may be produced by positioning an acoustic structure in the wave path of the transducer, with a rubber absorber of parallel lines acting like an optical diffraction grating, to produce diffracted ultrasound beams.

However, if one were to use an absorbing structure, approximately half of the ultrasound energy is absorbed. It is therefore more efficient to actually structure the transducer to produce the same pattern of thin stripes of energy produced by the blocking "grating". (As will be seen, structuring the transducer as the diffracting structure leads to other advantages such as flexibility of beam patterns produced, etc.)

One example of structuring the transducer would be the electroding of a piezoelectric transducer so that only portions of the material would be energized. Putting on stripe electrodes would, as is well-known in optical diffraction, produce stripes of emission producing the same sort of diffracted beams as would a blocking "grating". The known principles of diffraction, such as the angle and relative energy of the beams produced, can be applied to the acoustic energy distribution of a transducer with a diffracting structure. The diffracting structure may be a structure overlying a plane-wave transducer, or may be transducer whose construction leads to diffracted beams.

Figure 1:
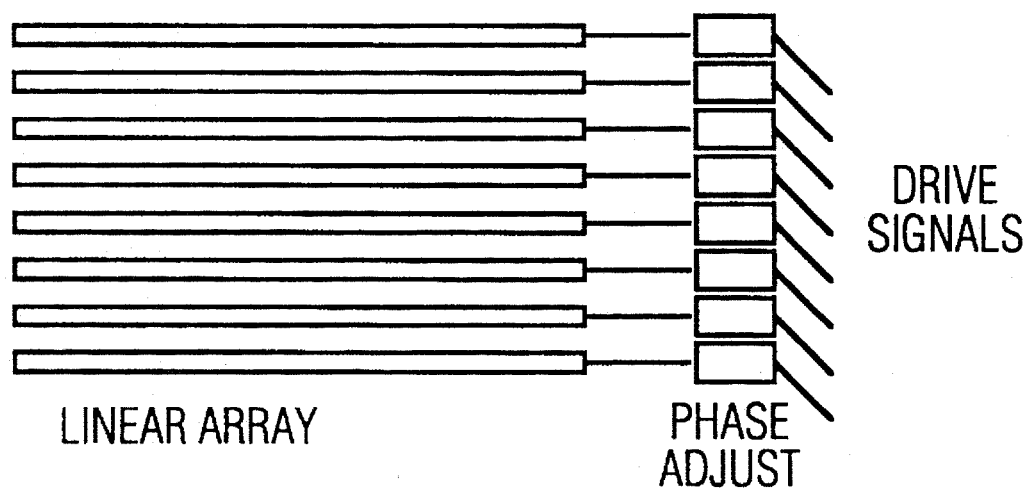
FIG. 1 shows a conventional (prior art) ultrasonic transducer.
Figure 2:
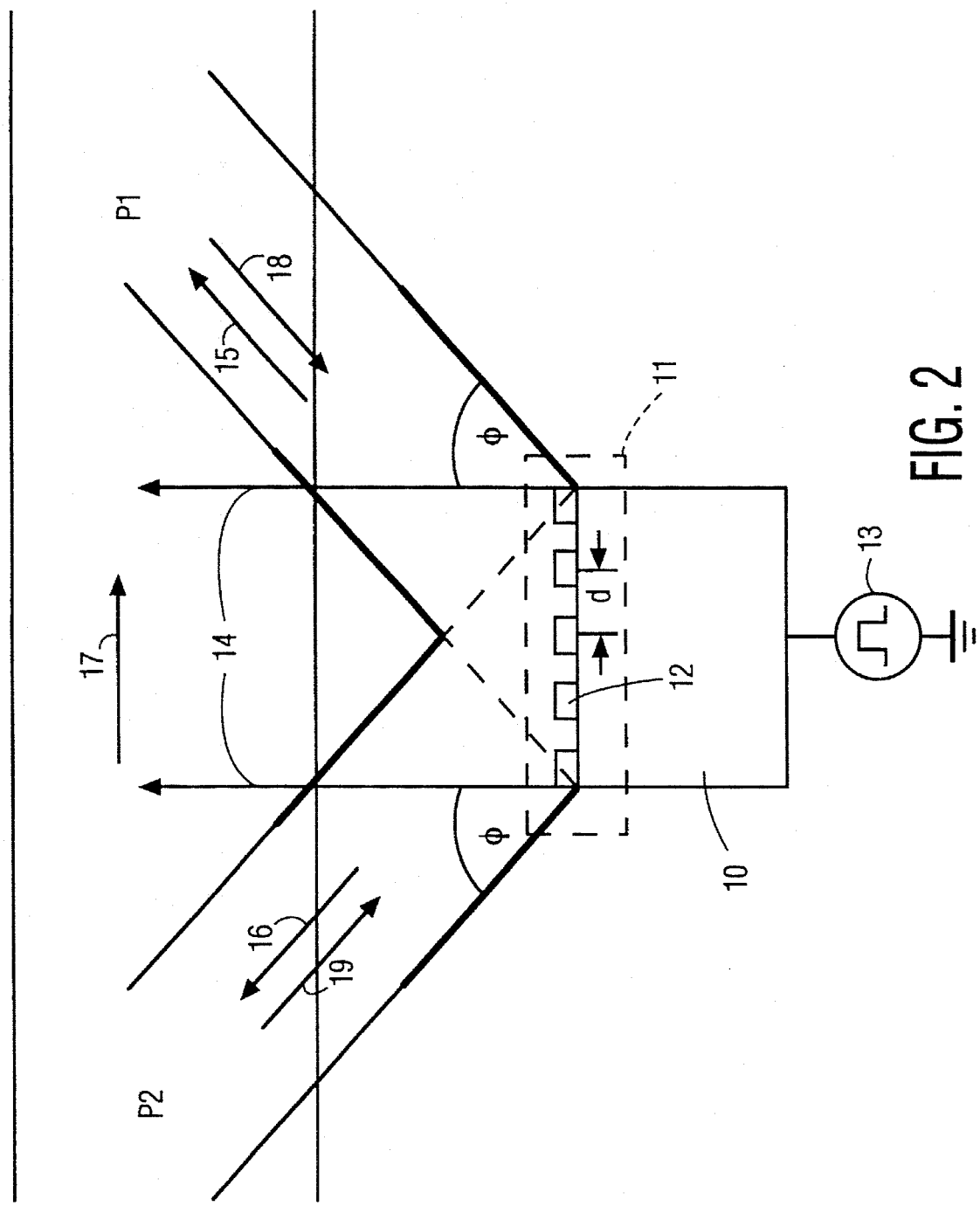
FIG. 2 shows an exemplary embodiment of the transducer which is the object of this invention.

Referring to FIG. 2 there is shown a Diffracting Doppler Transducer (DDT) 10 which is the object of the present invention. The DDT 10 includes a grating-like-structure 11 comprised of an array of line transducer elements 12 which are separated from one another by a distance d. The DDT 10 is excited by a pulse generator 13. The DDT 10 can also be excited by any other conventional source of power.

The DDT 10 operates in a manner analogous to an optical diffraction grating. See Born & Wolf, *Principles of Optics* at pp. 401–414, Pergamon Press, Oxford (3d ed. 1964). An optical transmission diffraction grating consists of a series of transparent lines on an opaque sheet. Such a grating permits a portion of an impinging light beam to pass as a non-diffracted beam, while diffracting another portion of the impinging beam into two diffracted beams at equal angles to the impinging beam of +/−φ where $$\phi = \arcsine\left(\frac{\lambda}{d}\right) \qquad (3)$$

and where λ is the wavelength of the impinging light and d is the spacing of the transparent lines. As is well-known in the art, diffraction is caused by the interference of waves from the multiple sources in the diffracting structure. See Born & Wolf. supra.

By being constructed like a grating 11, the DDT 10 produces three insonifying beams—non-diffracted beam 14, and diffracted beams 15 and 16. Diffracted beams 15 and 16 are produced at the respective angles of ±φ to non-diffracted beam 14 (which is perpendicular to the DDT 10), where φ is determined by equation (3), and λ is equal to c/f, where c is the velocity of propagation in the fluid and f is the frequency of excitation.

Diffracted beams 15 and 16 are directed towards a moving fluid 17 under investigation. Beam 15 insonifies the fluid 17 at a first point P1 and beam 16 insonifies the fluid 17 at a second point P2. The fluid 17 backscatters the diffracted beams 15 and 16 back towards the DDT 10 as backscattered diffracted beams 18 and 19, respectively. By measuring the frequency shift of the reflected beams 18 and 19, one can determine the velocity v of the fluid 17 using two equations (2), as described above.

Changing the frequency of excitation of the DDT 10, i.e., changing the ratio of λ to d, changes the angle between beams 14, 15 and 16. Beams 14, 15 and 16 are produced by the DDT 10 with calculable and equal angles between the beams, as per equation (3).

Unlike multitransducer systems, only a single DDT 10 is required to produce multiple insonifying beams 15 and 16. Thus, the need for multiple transducer elements and signal cables is eliminated, inasmuch as the DDT 10 requires at most two cables. The DDT 10 is able to determine the velocity v of the fluid 17 from two equations in two unknowns, regardless of the angle θ, without having to employ multiple transducers. In addition, the operating frequency of the DDT 10 can be varied, changing the angle of the beams 15 and 16 so that the velocity of the fluid 17 can be determined several ways, thereby providing a means for checking the accuracy of the value obtained for the velocity v.

Figure 3:
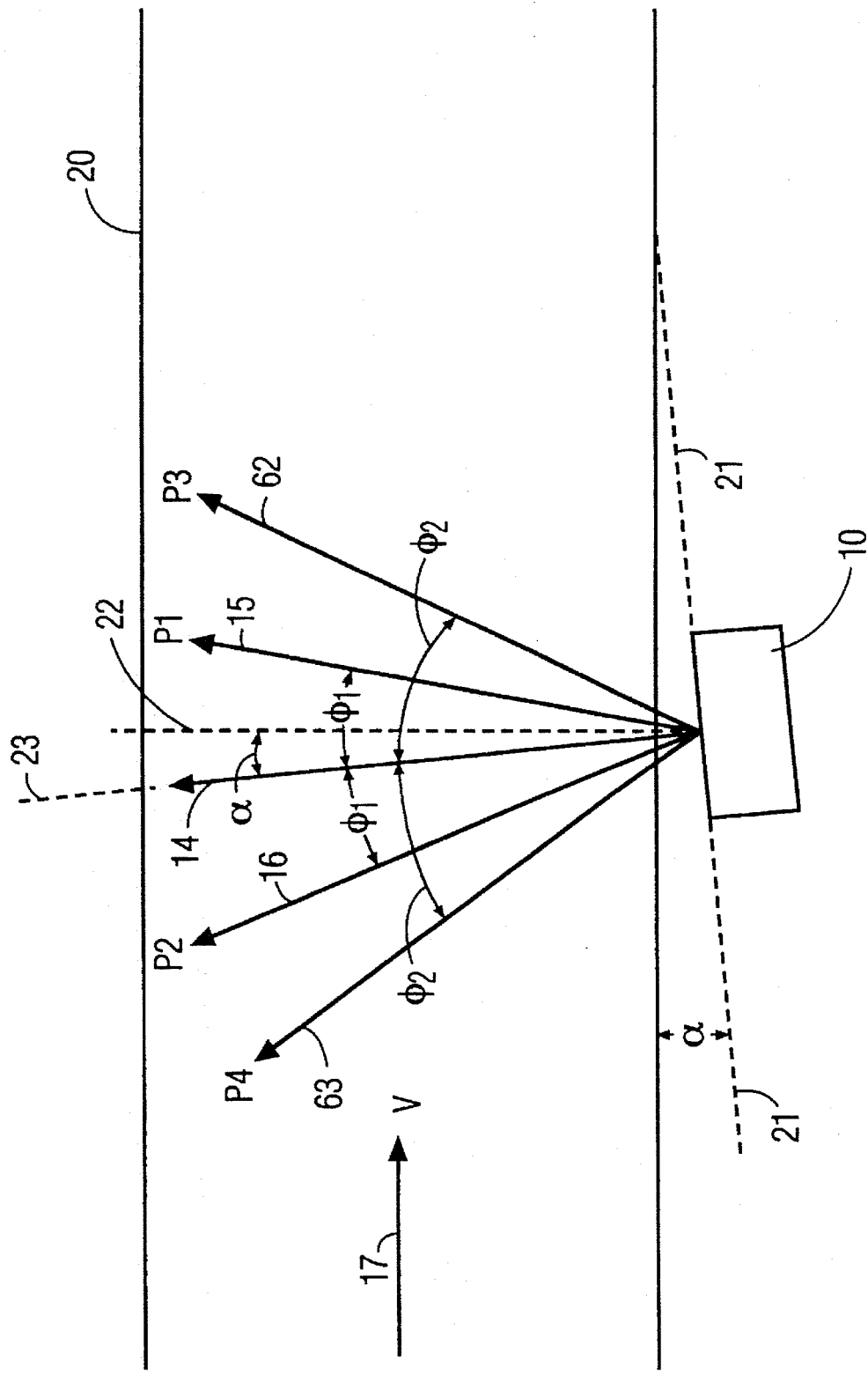
FIG. 3 shows a schematic representation of the transducer shown in FIG. 2 in proximity to a lumen.

Referring to FIG. 3 there is shown a schematic representation of the DDT 10 attached to a blood vessel 20 at an arbitrary angle α to the flow velocity v. (Plane 21 is shown parallel to DDT 10 at angle α from blood vessel 20). An angle φ (equal to $\phi_1$, as shown) represents the angle of the diffracted beams 15 and 16 from a perpendicular 53 to the DDT 10, both positively to the right and negatively to the left of the perpendicular 53. Non-diffracted beam 14 is shown in line with perpendicular 53 at angle α to a perpendicular 22 to the flow velocity v.

Employing the DDT 10 allows the following equations to be written to determine the velocity v of the fluid 17:

$$v = .5 \cdot \frac{f_{d1}}{f \cdot \sin(\phi + \alpha)} \text{ and } = .5 \cdot \frac{f_{d2}}{f \cdot \sin(\phi - \alpha)} \qquad (4)$$

where $$\sin(\phi) = \lambda/d = \frac{c}{fd} \qquad (5)$$

and where c is the velocity of propagation, f is the frequency of the insonifying beam, $f_{d1}$ is the Doppler shift frequency measured from reflected beam 18, $f_{d2}$ is the Doppler shift frequency measured from reflected beam 19, and d is the spacing between the grating elements. From equation (4), the velocity of interest and angle can be uniquely determined from the Doppler shift frequencies and from the operating frequency of the DDT 10.

Using broad-band ultrasound transducers, well-known to those skilled in the art, permits the frequency f of the insonifying beam to be varied by varying the frequency of the voltage applied to the transducer. Use of a broad-band transducer allows the following set of equations to be written to determine the velocity v of the fluid 17:

$$v = .5 \cdot \frac{f_{d1}}{f_1 \cdot \sin(\phi_1 + \alpha)} \text{ and } v = .5 \cdot \frac{f_{d3}}{f_2 \cdot \sin(\phi_2 + \alpha)} \qquad (6)$$

where $$\phi_1 = \sin^{-1}\left(\frac{c}{f_1 \cdot d}\right) \text{ and } \phi_2 = \sin^{-1}\left(\frac{c}{f_2 \cdot d}\right) \qquad (7)$$

where $f_1$ and $f_2$ are two distinct frequencies of excitation of the DDT 10. Frequency $f_1$ generates diffracted beams 15 and 16 at angles $\phi_1$ from the perpendicular 53; frequency $f_2$ generates diffracted beams 62 and 63 at angle $\phi_2$ from the perpendicular 53, which insonify the fluid 17 at points P3 and P4, respectively, as shown in FIG. 3. A Doppler shift frequency $f_{d3}$ is measured from backscattered energy from beam 62. Thus there are two equations, (6) and (7) in two unknowns, v and α. To accurately determine the velocity v of interest using equation (4) requires that the fluid 17 being measured not change velocity between the two different positions P1 and P2 where positively displaced beam 15 and negatively displaced beam 16, respectively, insonify the fluid 17. In general this will be true, as for example where the measurement is being made in a blood vessel 10 mm across and the difference between the points of measurement is on the order of 10 mm, assuming that the angle φ is 30 degrees. Typically, the velocity of fluids does not change over a 10 mm path. However, if because of curvature of the vessel, i.e., stenosis, there is a rapid change in velocity, it becomes more accurate to use two or more frequencies $f_1$ and $f_2$, etc. of excitation to narrow the spatial difference in positions of insonification. Thus, in the above example, there will be only a few mm difference between the two positions P1 and P3 (see FIG. 3), as opposed to 10 mm between P1 and P2. Thus equation (6) may provide a more accurate determination of the velocity than does equation (4) because equation (6) minimizes the difference in the spatial position where the fluid velocity is measured. In addition, equation (6) permits one to determine the velocity of the fluid under investigation regardless of velocity changes between points P1 and P2.

Fabricating the DDT 10 from a plastic piezoelectric material such as PVF2 and its polymers, see Brown, L., *Piezoelectric Polymer Ultrasound Transducers for Nondestructive Testing*, Proceedings of ASNT Fall Conference, Valley Forge, Pa., Oct. 9–13, 1989, permits the fabrication of a transducer which is not only light, flexible and inexpensive, but which is capable of operating in a manner analogous to an optical phase diffraction grating rather than a transmission grating. (Of course any piezoelectric material may be used in a phase-diffraction-grating mode). Phase diffraction gratings are optical devices that utilize phase shift to modulate light so that more of an impinging optical beam goes into the diffracted beams. See Born & Wolf, supra. Phase diffraction gratings permit 100% of an impinging light beam to be directed into the diffracted beams as compared to a maximum of 50% of an impinging beam being directed into the diffracted beams when a transmission grating is employed. Similarly, Diffracting Doppler Transducers using the technique described below can put all of their emitted ultrasound beam energy into the diffracted beams.

Figure 4:
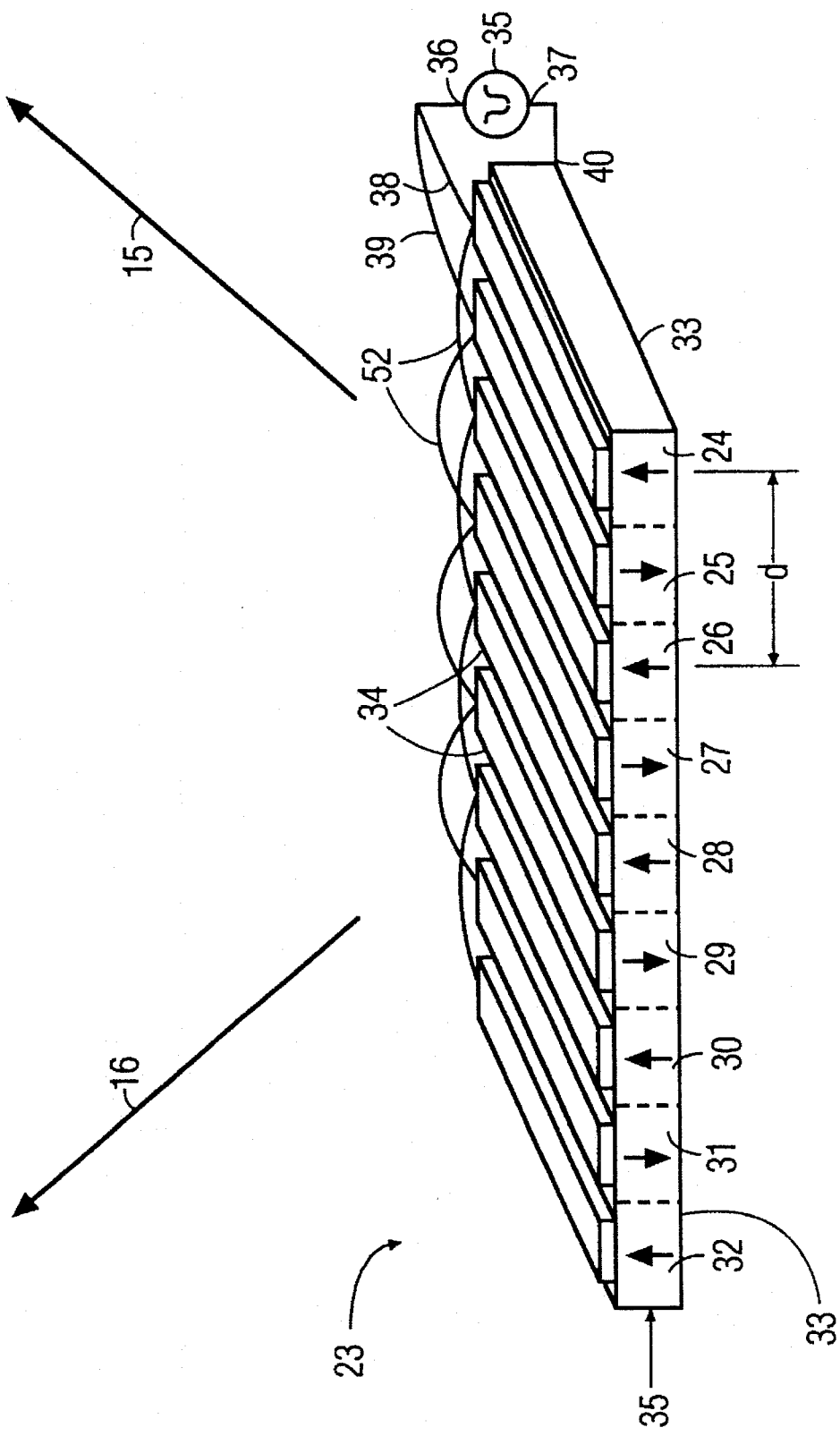
FIG. 4 shows a second embodiment of the transducer which is the object of this invention coupled to a single source of reference potential.

Referring to FIG. 4 there is shown a preferred embodiment of a DDT 23 fabricated from alternately polarized strips 24–32 of PVF2 piezoelectric material, each of which are a defined portion of a piezoelectric planar member 35. Strips 24, 26, 28, 30 and 32 are positively polarized as indicated by the upward direction of the arrows in FIG. 4. Strips 25, 27, 29 and 31 are negatively polarized as indicated by the downward direction of the arrows in FIG. 4. Each of the PVF2 strips 24–32 have an electrode 34 formed, preferably centrally, on each top strip surface as shown. Electrodes 34 consist of a suitable metal such as gold or silver and are formed using conventional photolithography techniques such as by vacuum deposition. Techniques for electroding piezo-polymers are disclosed in the Brown article mentioned above. A continuous ground plane 33 is formed on the bottom surface of PVF2 planar member 35 using a similar conventional photolithography technique.

As is known by those skilled in the art, PVF2 material can be polarized by applying a high voltage to the material. Polarization of each of the strips 24–32 is accomplished by applying a high voltage between each individually associated electrode 34 and the ground plane 33. The voltage required depends on the thickness of the piezoelectric material. A suitable voltage would be, for example, 7,000V for 80 micron thick PVF2 material. The polarity of the applied voltage then determines the polarity of the associated strip. The PVF2 material directly beneath the associated electrode 34, along with portions of PVF2 on either side, become polarized to define the strip. Thus, strips 24–32 are formed as defined portions of the planar member 35, with the dotted lines denoting the demarcation between the strips. Of course, all of the strips having the same polarity can be polarized at once by first interconnecting them with leads 52, and then applying the voltage of the desired polarity. Alternately polarized strips 24–32 with the associated electrodes 34 form the grating 11 referred to in the description of FIG. 2. The distance d from the middle of strip 24 to strip 26, i.e. one spatial period of the diffracting pattern, is equivalent to the distance d of FIG. 2 and in equation (3). It is noted that the DDT 23 of FIG. 4 uses a spacing of d/2 between the center of adjacent elements such as 24, 25 whereas the DDT 10 of FIG. 2 uses a spacing of d between the adjacent elements 12. As a result, three beams are produced with DDT 10 in the FIG. 2 embodiment, i.e., nondiffracted beam 14 and diffracted beams 15 and 16, whereas only the two diffracted beams 15 and 16 are formed using the DDT 23 of FIG. 4. Equations (3) through (7) remain valid for the DDT 23 configuration, with DDT 23 replacing DDT 10 in FIGS. 2 and 3. For example, at 5 MHz, $\lambda$ is 0.3 millimeters in blood, so for operating the DDT 23 with beams at 45°, d should then be 1.414 wavelengths, from equation (3). Therefore, the center to center distance between strips 24 and 26 should be 0.424 millimeters (17 mils), with each electrode 34 about 8 mils wide and with 0.5 rail gaps between the edges of adjacent electrodes 34.

By utilizing the capability of piezoelectric materials to be either positively or negatively polarized, the strips 24–32 of the DDT 23 can be excited as shown in FIG. 4, thus enabling the DDT 23 to operate in a high-diffracting mode, with the grating 11 being analogous to a phase diffraction grating, such that 100% of the acoustic energy produced by the DDT 23 is directed into diffracted beams 15 and 16.

In FIG. 4, alternately polarized strips 24–32 are excited with the same polarity so that the alternately polarized strips move in opposite directions, thus producing diffracted beams 15 and 16. A negative pulse generator 35 having a first terminal 36 and a second terminal 37 excites the strips 24–32 of the DDT 23. Terminal 36 is coupled via lead 38 to strip 24, and is also coupled via lead 39 to strip 25. Terminal 37 is coupled via lead 40 to the ground plane 33. Positively polarized strips 24, 26, 28, 30 and 32 are coupled together via leads 52 as shown in FIG. 4. Similarly, negatively polarized strips 25, 27, 29 and 31 are also coupled together via leads 52 as shown in FIG. 4. It should be understood that the leads 52 are shown schematically for convenience as individual wires protruding above the top surface of the strips 24–32. Preferably, however, leads 52 consist of electrodeposited metal on the top surfaces of strips 24–32 (extending beyond that shown in FIG. 4), similar to electrodes 34, and patterned to interconnect the electrodes 34 that are disposed on the same polarity strips. Negative pulse generator 35 then excites the positively polarized strips 24, 26, 28, 30 and 32 negative, and excites the negatively polarized strips 25, 27, 29 and 31 positive. Alternatively, if a positive pulse were provided to the DDT 23, the positively polarized strips 24, 26, 28, 30 and 32 would be excited positively, and the negatively polarized strips 25, 27, 29 and 31 would be excited negatively, and move in opposite directions.

Figure 5:
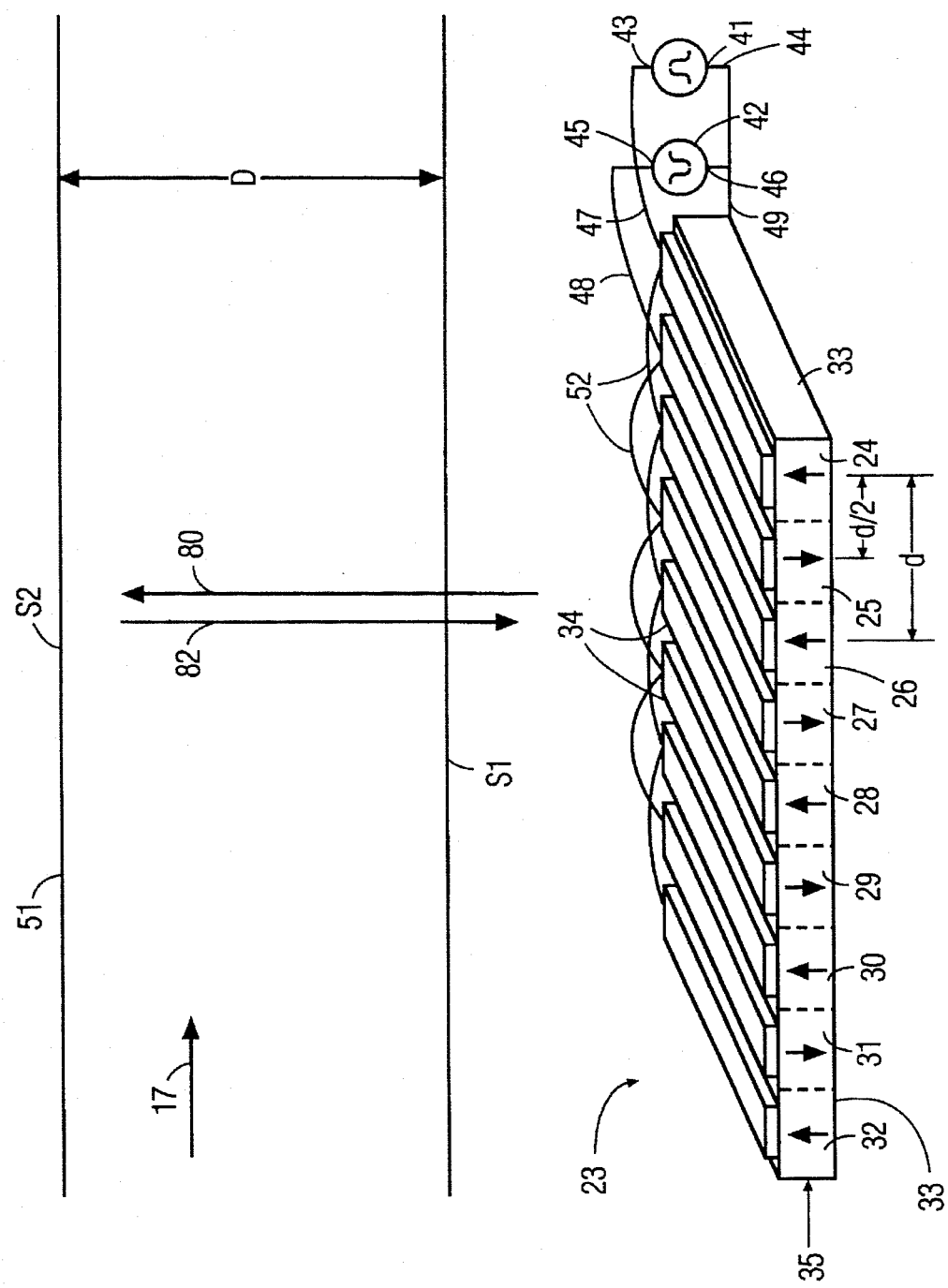
FIG. 5 shows the transducer shown in FIG. 4 coupled to two sources of reference potential.

FIG. 5 shows the DDT 23 shown in FIG. 4 in a non-diffracting mode. Numerals used in FIG. 4 are employed in FIG. 5 to denote identical parts. Positively polarized strips 24, 26, 28, 30 and 32 are coupled together as shown in FIG. 5. Similarly, negatively polarized strips 25, 27, 29 and 31 are also coupled together as shown in FIG. 5. Positive pulse generator 41 and negative pulse generator 42 excite the alternately polarized strips 24–32 of the DDT 23. Pulse generator 41 has a first terminal 43 and a second terminal 44. Likewise, pulse generator 42 has a first terminal 45 and a second terminal 46. Terminal 43 is coupled via lead 47 to strip 24, terminal 45 is coupled via lead 48 to strip 25, and terminals 44 and 46 are coupled via common lead 49 to the ground plane 33. Pulse generator 41 excites the positively polarized strips 24, 26, 28, 30 and 32 positive, while pulse generator 42 excites the negatively polarized strips 25, 27, 29 and 31 positively. The alternately polarized strips 24–32 are thus all excited positively such that all the strips 24–32 move together producing a single non-diffracted beam 50 as shown in FIG. 5. Alternatively, if the positive pulse generator 41 were to excite the negatively polarized strips 25, 27, 29 and 31, and the negative pulse generator 42 were to excite the positively polarized strips 24, 26, 28, 30 and 32, then all the strips 24–32 would be negatively excited and move together.

By measuring the diameter D of a lumen 51 through which the fluid 17 flows, the DDT 23 can determine the absolute flow volume, which is the product of the average velocity times the area of the flow, i.e. $v \times \pi/(D/2)^2$. To measure the diameter D, the DDT 23 is biased as is shown in FIG. 5, so that the non-diffracted beam 80 is produced. Nondiffracted beam 80 is emitted by the DDT 23 from one side S1 of the lumen 51 towards an opposite side S2 of the lumen 51. Opposite side S2 reflects non-diffracted beam 80 back towards the side S1 as reflected non-diffracted beam 82, thereby enabling the DDT 23 to measure the diameter D of the lumen 51.

The distance measured to the opposite side of the lumen 51 is the diameter D multiplied by the cosine of the angle α. (The velocity vector is parallel to the lumen axis). The angle α can be determined from either equation (4) or (6) so that the diameter D and the velocity v, as derived from the spectrum of the Doppler frequency when the lumen 51 is insonified over its whole area, gives the volume flow.

Another way of generating the simultaneous diffracted beams 15 and 16 is to utilize the configuration of FIG. 5, except that the same polarization is used for each piezoelectric strip 24–32. This embodiment avoids the necessity of selectively applying a high voltage to the electrodes 34 to polarize the distinct portions of the planar member 35 that define the strips 24–32. With all of the strips 24–32 of the same polarization, the alternating polarity between the strips 24–32 necessary to produce the simultaneous diffracted beams is achieved solely as a result of the opposite polarity of the pulse generators 43 and 45.

Referring again to FIG. 4, if the strips 24–32 are likewise all of the same polarity, then the single pulse generator 35 will generate the nondiffracted beam 14 because all of the electrodes 34 are fed with a signal of the same phase. Thus, the designer has a choice as whether to use the alternately polarized strip configurations of FIGS. 4 and 5, or to utilize the same polarization for all of the strips. Either case can produce the desired beams by the appropriate phasing of the electrodes.

In the preferred embodiment of the DDT 23, the three leads 38, 39 and 40 or 47, 48 and 49, are extracted through the skin for short-term monitoring, or attached to a telemetry device that transmits the measured data to a receiver, such instruments being well-known in the art. The DDT 23 can operate in either the hi-diffracting mode to determine the velocity v of the fluid 17, or in the non-diffracting mode to measure the diameter D of the lumen 51, or in some combination, if desired, of out-of-phase and in-phase operation to simultaneously determine both the velocity v and the diameter D.

Figure 6:
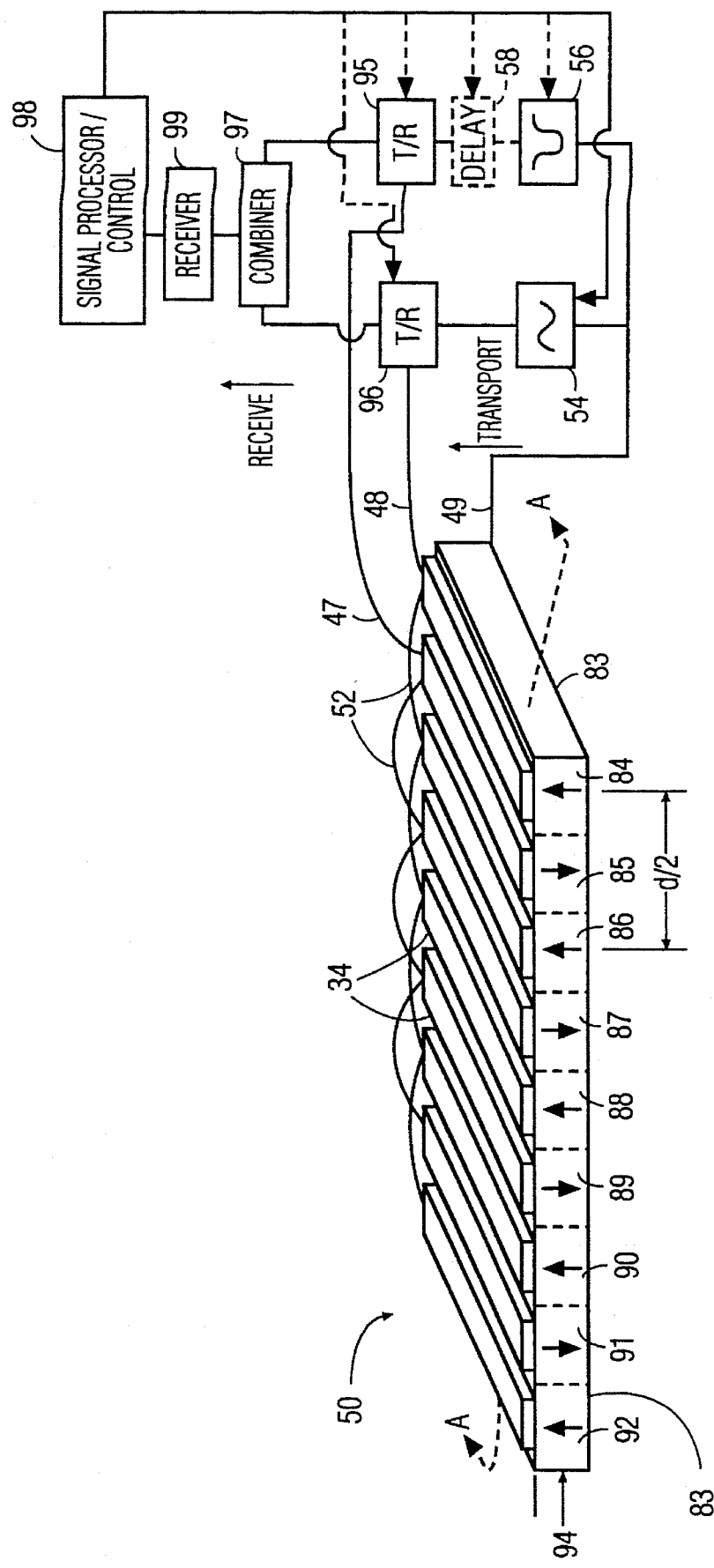
FIG. 6 shows a third embodiment of a transducer apparatus according to this invention.
Figure 7:
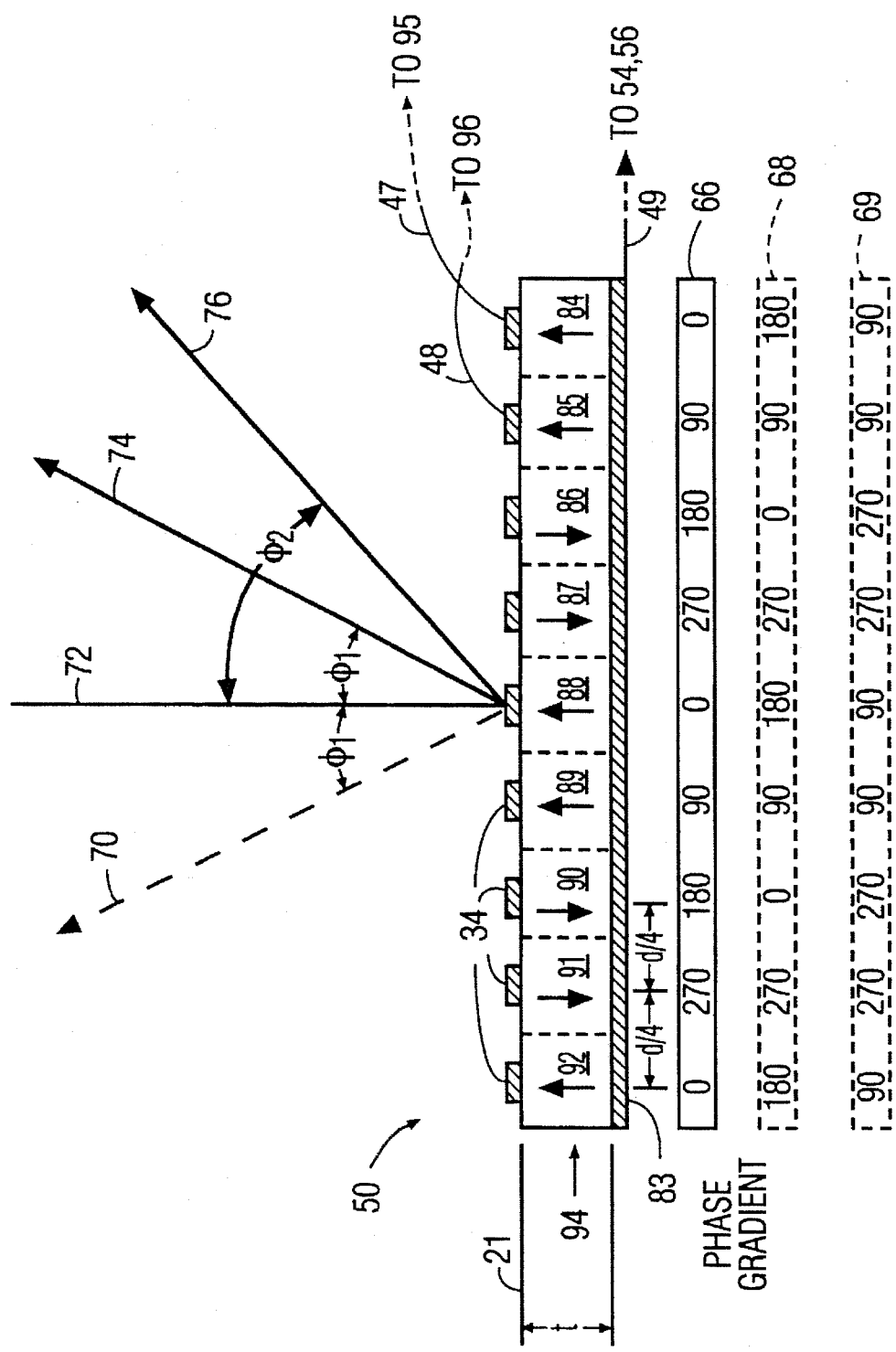
FIG. 7 is the cross-sectional view A—A of FIG. 6.

Referring now to FIGS. 6 and 7, another embodiment of the present invention is shown, hereinafter referred to as a Unibeam Diffracting Transducer (UDT) 50. Like reference numerals are used to designate like features or components. FIG. 7 is the cross-sectional view A—A of FIG. 6, with the leads 52 omitted. The UDT 50 operates to transmit and receive a single diffracted ultrasound beam at a time, at an illustrative angle $\phi_1$ or $\phi_2$ from its perpendicular 72. UDT 50 differs from DDT 23 of FIG. 4 in several ways. Unitary piezoelectric strips 84–92, preferably of PVF2 material, are disposed in a series chain as shown, and formed as defined portions of a thin PVF2 member 94. In contrast to the previous embodiments, two strips of the same polarity are adjacent to one another, followed by two strips of the opposite polarity, as indicated by the directional arrows shown. Strips 84 and 85 are of positive polarity; strips 86 and 87 are of negative polarity and so on. Alternatively, strips 84 and 85 could be of negative polarity, with strips 86 and 87 of positive polarity, and with the subsequent strips following in sequence. An electrode 34 is formed centrally on the top surface of each of the strips 84–92, such as by using conventional electrodeposition as discussed above. A continuous ground plane 83 is formed on the bottom surface of the PVF2 member 94 opposite the electrodes 34. Polarization of each strip is achieved by applying a high voltage of the desired polarity between its respective electrode 34 and the ground plane 83. For a PVF2 thickness t of 80 microns, ±7,000V is a suitable high voltage. Every other strip is interconnected by the leads 52. Thus, the electrodes 34 on strips 84, 86, 88, 90 and 92 are connected; the electrodes 34 on strips 85, 87, 89 and 91 are connected.

Leads 52 are shown in FIG. 6 for convenience as thin wires but are preferably electrodeposited metal, deposited on top extended surfaces of the strips 84–92 to achieve the above-described connections between the strips. This embodiment is shown in the plan view of FIG. 8. The electrodes 34 are extended onto top surfaces of extended portions 103, 104 of the planar member 95, with every other electrode 34 interconnected with bus bars 100 and 101, respectively. The boundaries between the strips 84–92 are demarcated with dotted lines. Lead 47 is bonded to bus bar 101, and lead 48 is bonded to bus bar 100 using thermocompression bonding or an equivalent suitable technique. Thus, in this preferred configuration, the leads 52 are eliminated, thereby reducing manufacturing labor since the bus bars 100, 101 can be printed simultaneously with the electrodes 34 using an appropriate photolithographic method. It is noted here that the electrode interconnection configuration using the bus bars of FIG. 8 is also preferably employed to interconnect the electrodes 34 of the DDT 23 in FIGS. 4 and 5.

Figure 8:
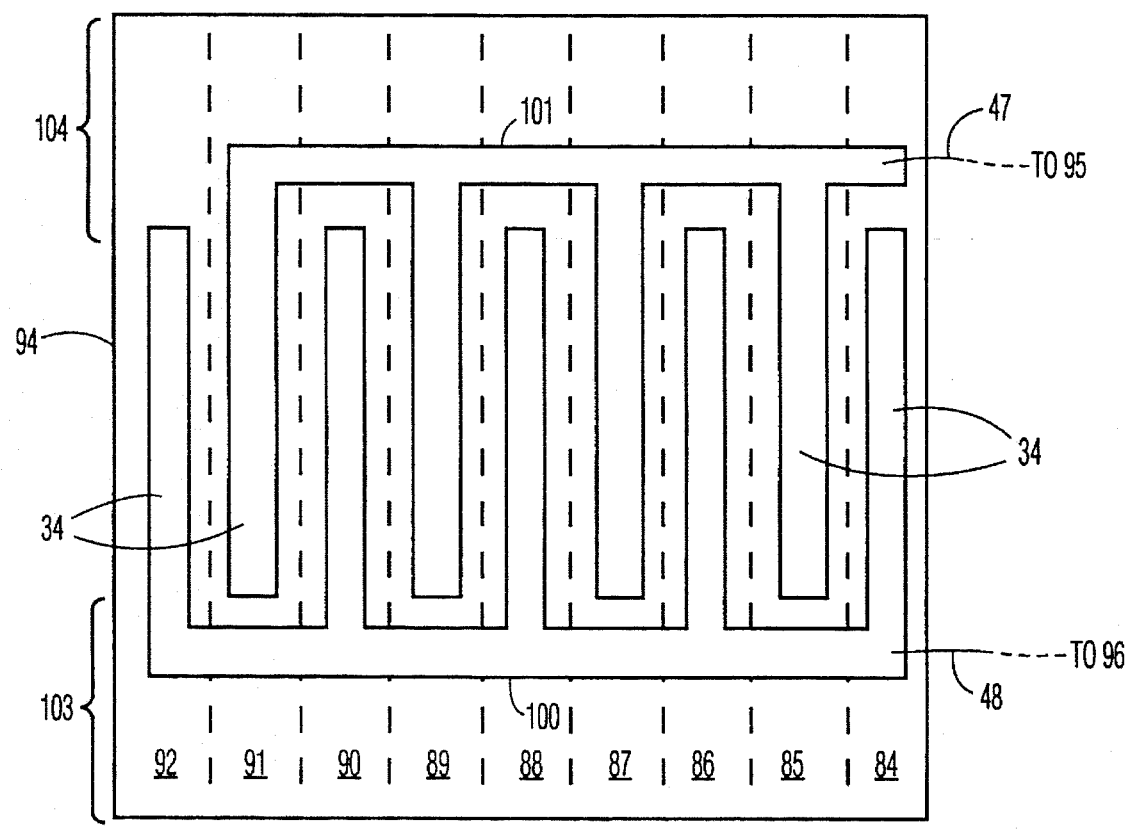
FIG. 8 is a plan view of the transducer apparatus of FIG. 6 depicting a preferred electrode interconnection configuration.

While the alternating polarity of the piezomaterial allows for easy fabrication, as shown in FIG. 8, a uniformly poled piezomaterial can also be used, as was discussed in connection to DDT 23. Whether by polarization or by means of the appropriate drive signals, as long as the movement of the surface follows the desired phase relationships of 66, 68, or 69 of FIG. 7, proper operation of the UDT is achieved.

Practically, the UDT 50 may be sewn onto or employed within a blood vessel. The leads 47, 48 and 49 are then extracted through the skin for short term monitoring as is commonly done in the art. A sign wave generator 54, coupled to the ground plane 83 via lead 49, applies an ultrasound signal at a frequency f to transmit/receive (T/R) module 96, which transmits the energy via lead 48 to strip 74 and to those strips connected thereto. A cosine wave generator 56, also coupled to ground plane 83 via lead 49, applies an ultrasound signal at the same frequency f to T/R module 95, which transmits the signal via lead 47 to strips 85, 87, 89 and 91.

An optional phase delay circuit 58 is shown schematically in between the cosine generator 56 and T/R module 95. Although the delay circuit 58 and cosine generator 56 are shown for convenience as two separate units, it is understood that they may be incorporated within a conventional signal generator. Or, the phase relationship between the sine generator 54 and the cosine generator 56 may be controlled by a suitable signal processor/control block 98 with or without the use of the delay circuit 58, as will be understood by those skilled in the art. In any event, without implementing additional phase delays with the delay circuit 58 or otherwise, the resulting phase of the strip 85 leads that of strip 84 by 90°, because the sine wave generator 54 leads the cosine wave generator 56 by 90° and the polarity of the piezoelectric material of the strips 84 and 85 are the same. This holds true provided that the insertion phase of the combination of T/R module 96 plus lead 48 is the same as that of T/R module 95 plus lead 47. Otherwise, phase differences between these two combinations will have to be compensated for in the delay circuit 58 or otherwise. Similarly, electrodes 34 on strips 84 and 86 are connected, so that the resulting phase of strip 86 leads that of strip 85 by 90°, since strips 85 and 86 are of opposite piezoelectric polarity. What results is a phase gradient, within the box denoted by reference numeral 66, between the strips 84 and 92 in which each successive strip leads the adjacent one by 90°. This phase gradient results in an ultrasonic beam at frequency $f_1$ radiated in the direction of vector 74 at an angle $\phi_1$ from the perpendicular 72. In general, a frequency f of excitation and the spacing d/4 between the successive elements 84–92 controls an angle $\phi$ of the radiated energy from the perpendicular 72, according to the equation $$\phi = \sin^{-1}(\lambda/d) \qquad (8)$$

which follows from equation (5). A frequency $f_1$ will then produce a beam along the directional vector 74 at angle $\phi_1$.

Figure 9:
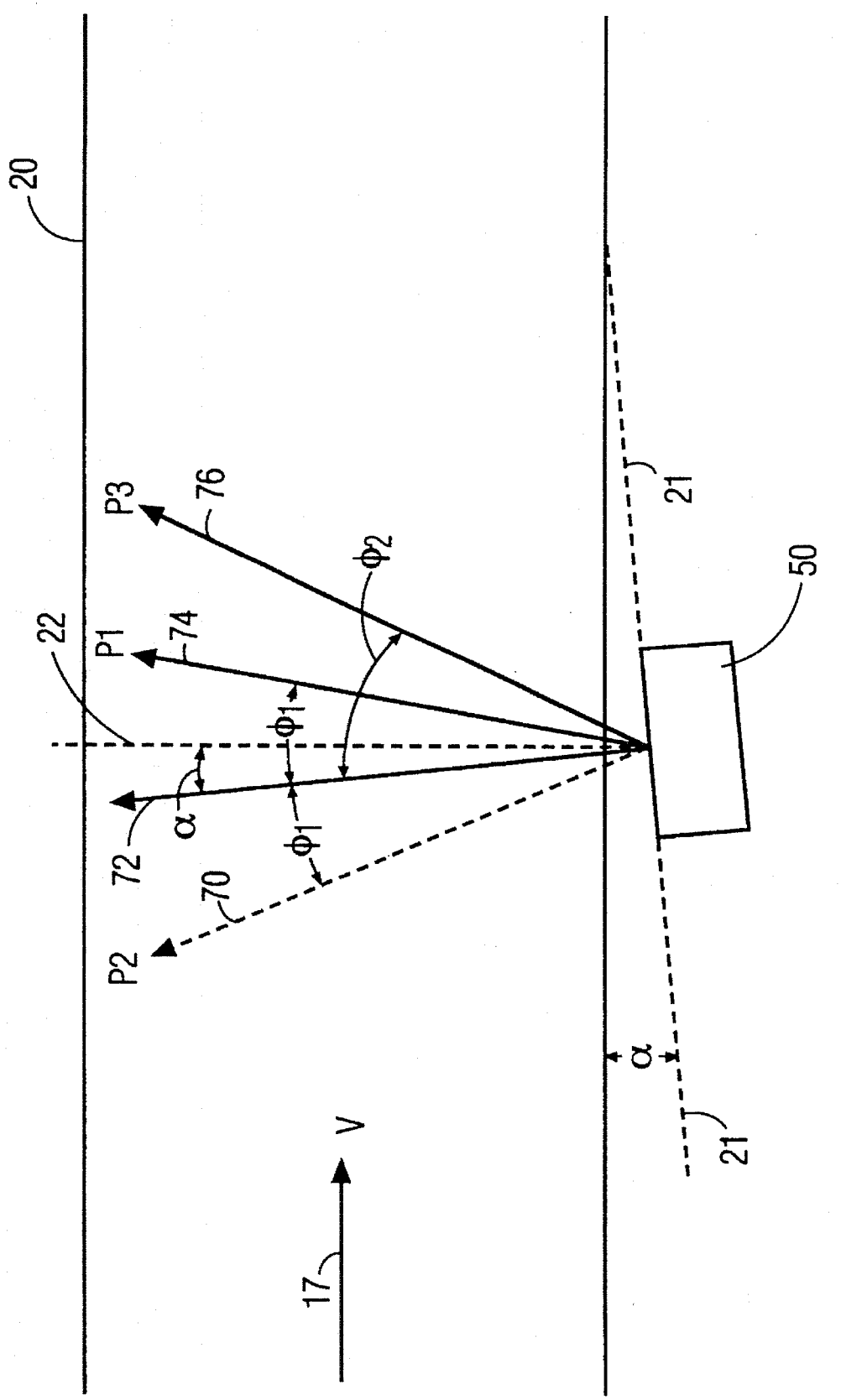
FIG. 9 depicts the transducer apparatus of FIG. 6 in proximity to a lumen to be insonified.

Two preferred modes of operation of the UDT 50 will now be discussed. Each mode will enable the determination of the velocity v of a fluid 17 flowing in a lumen 20 as shown in FIG. 9. Also, the angle $\alpha$ of orientation of the major surface 21 of UDT 50 with respect to the direction of fluid flow can be determined in each mode of operation. In the "uni-frequency" mode, a pulsed ultrasound beam at frequency $f_1$ is first generated in the direction of vector 74 at angle $\phi_1$ as discussed above. The fluid 17 is thus insonified at a point P1, resulting in energy reflected back at a frequency $f_{d1}$ as a function of fluid velocity v, according to the equation $$v = \frac{.5 \cdot f_{d1}}{f_1 \cdot \sin(\phi_1 + \alpha)} \qquad (9)$$

where $$\phi_1 = \sin^{-1}(c/f_1 d). \qquad (10)$$

The reflected energy at frequency $f_{d1}$ can be measured using a conventional receiver 99 and Doppler signal processor/control module 98. The reflected energy is collected by UDT 50, and routed via leads 47, 48 to T/R modules 96 and 95 respectively. The T/R modules operate to pass the received energy to a combiner 97 which conveys it to the receiver 99. The signal processor/control module 98 stores the receive frequency $f_{d1}$ information from receiver 99.

After the information about the flow from the beam 74 is received (which takes about 13.33 microseconds per centimeter of lumen to be covered), the signal processor/control module 98 controls generators 54, 56 and delay circuit 58 to transmit another pulsed ultrasound beam in the direction 70 at frequency $f_1$. This is accomplished by the phase delay circuit 58 introducing a phase delay of 180° to the strips 85, 87, 89 and 91, resulting in the phase gradient designated by reference numeral 68. The phase gradient 68 results in the mirror-image beam in direction 70 at the angle $\phi_1$. This beam insonifies the fluid 17 at point P2, which reflects energy back at the Doppler shift frequency $f_{d2}$. Then, $$v = \frac{.5 \cdot f_{d2}}{f_1 \cdot \sin(\phi_1 - \alpha)}. \qquad (11)$$

Thus there are two equations, (9) and (11), in two unknowns, v and $\alpha$. The fluid velocity v and orientation $\alpha$ can then readily be determined by the signal processor 98. Hence, the "uni-frequency" mode of operation of UDT 50 operates on the same principle as discussed for the DDT 23 in regard to the generation of equal and opposite diffracted beams governed by equations (4) and (5). However, utilizing the UDT 50 in the manner described is advantageous in that each ultrasound beam is transmitted at twice the relative power level, because all of the radiated power is contained within one diffracted beam at a time. As a result, the signal to noise ratio of the reflected beams are improved.

It is also noted that operation in the "uni-frequency" mode is based on the assumption that the velocity v of the fluid 17 has not changed between points P2 and P1, which is a good assumption for most practical situations. If there is a change in velocity between these two points, measurement accuracy suffers accordingly.

In the second mode of operation, referred to as the "multi frequency mode", a pulse of ultrasound energy is first generated at frequency $f_1$ in the direction 74 in the same manner as was done in the uni-frequency mode. Microseconds later, the frequency is then changed to $f_2$ while the inter-element phasing remains unchanged, thereby generating a second ultrasound beam in the direction of vector 76 at an angle $\phi_2$ from the perpendicular 72. This beam insonifies the fluid at point P3 whereupon energy is reflected back towards UDT 50 at a Doppler shifted frequency $f_{d3}$. The equation for velocity v can then be written $$v = \frac{.5 \cdot f_{d3}}{f_2 \cdot \sin(\phi_2 + \alpha)} \qquad (12)$$

where $$\phi_2 = \sin^{-1}(c/f_2 d). \qquad (13)$$

The two unknowns, v and $\alpha$, can then readily be determined from the two equations (9) and (12).

The multi-frequency mode of operation is preferred over the uni-frequency mode when it is suspected that the fluid velocity may be changing over short distances. By controlling the frequency $f_2$, the insonification point P3 can be selected as close to P1 as desired to minimize error associated with a slightly changed velocity.

The UDT 50 configuration also has the versatility of being adaptable to provide two simultaneous diffracted beams at equal but opposite angles from the perpendicular 72 with equal or unequal power in each beam. For instance, if the delay circuit 58 is employed to introduce a 90° phase lag instead of a 180° lag, then the resulting phase gradient will be as within the box depicted by reference numeral 69. This will result in diffracted beams of equal power along direction vectors 70 and 74. Velocity and orientation can then be determined using substantially the same Doppler measurement equipment, with the computations modified to account for the different element structure. Moreover, a non-diffracted beam can also be generated in the direction of plane 72 using appropriate phasing to measure lumen diameter in a similar manner as was done with the FIG. 5 configuration. However, this would require additional phase delay circuitry and/or signal sources, undesirably adding complexity to the measurement. The DDT 23 configuration of FIG. 5 is therefore preferred for this measurement.

In some situations, it may be desirable to generate simultaneous diffracted beams at equal but opposite angles with differing beam power. This can be achieved by controlling the phase delay circuit 58 to introduce a phase lag other than 90° or multiples of 90°.

The accuracy of the determination of the velocity v of the fluid obtained using equations (6) or (9) and (11) may be increased by determining the velocity v at more than two frequencies f. These frequencies can be used either sequentially or simultaneously, depending upon the signal-noise ratio obtainable for the particular situation. In general, the standard FFT-type Doppler signal analyzers usually employed for spectral analysis will provide good operation for the DDT 23 or UDT 50.

A continuing medical need is the ability to measure the blood flow through a replacement vessel, such as a graft. A commonly encountered problem is attempting to measure the flow after the graft forming the replacement vessel has closed up. A DDT or UDT such as the structure shown in FIGS. 4 and 5 or 6 could easily be sewn onto the outside surface of such a graft as shown in FIG. 3. Such a DDT or UDT is approximately 2.0 centimeters long and about 0.6 mm thick, so that the center of the half-wave resonance of such a DDT is about 15 MHz. For the nominal diffracted beam to be at 45 degrees from the perpendicular axis of the DDT, the spacing of the grating is 1.414 wavelengths. $\lambda$ is 0.1 mm in blood at 15 MHz. Therefore, the centers of strips with the same polarity (in the case of DDT 23) are separated by 0.14 mm, or 5.6 mils. The structure would then have 2.4 mil wide strip electrodes with a 2.7 mil spacing between the centers of adjacent, oppositely polarized strips. The gaps between the edges of adjacent electrodes are then 0.3 mils. Such a structure is fabricated by standard photolithographic techniques which can be used with PVF2. In general the ratio of strip spacing to wavelength should be 0.05 to about 1 times the wavelength of ultrasound used, corresponding to a 3° to 90° diffracted angle. The UDT 50 of FIG. 6 employs electrodes 34 with an inter-electrode spacing (or "interstrip" spacing) of "d/4" as compared to "d/2" for the DDT 23 of FIGS. 4 and 5. Thus, to generate beams at the same angles as DDT 23, the above detailed dimensions for electrode and strip widths need to be halved. In any event, thin wires are connected to the graft and extracted through the skin for short-term monitoring, or attached to a telemetry device that would transmit the measured data to a receiver for longer monitoring periods.

To measure the flow of blood through an artery, rather than try to line up the Doppler insonifying beam with the flow axis, a DDT or UDT such as is shown in FIGS. 4 and 5 or 6, could be positioned onto a guidewire in the form of bands around a catheter. These bands would produce a cone set of insonifying beams that would permit the blood flow to be measured.

In the event that a larger surface area is needed to obtain a good signal for determining the velocity v, a DDT or UDT such as is shown in FIGS. 4 and 5 or 6 could be deployed on the end of a guidewire. Such a flow-measuring guidewire would be pushed by the blood flow towards a wall of a lumen where the flow volume could be measured. Such a structure would have a minimal effect on the flow volume being measured and could be used to monitor bodily systems such as the circulatory system.

The DDT or UDT structure can be used in conventional pulsed send-receive mode or in continuous-wave mode. The pulsed send-receive mode was used in the abovedescribed illustrative operating modes for the UDT 50. As with conventional Doppler transducers, continuous mode may be implemented by using one portion of the transducer for sending and a separate portion for receiving, as is well-known in the art. Signal-processing for Doppler signal analysis is also well-known. The two modes of DDT operation, described as finding the solution to equations (4) or (6) can be implemented either by an iterative calculation performed with microprocessors, or by algorithms using the measured quantities to approximate the exact solutions. In addition, the value for the velocity v obtained from equation (4) can be checked using equation (6), and the value of the velocity v obtained from equation (6) can be checked by using equation (6) at different frequencies f. These same principles can likewise be followed in regard to UDT 50 operation governed by equations (9), (11) and (12).

It will be understood that the embodiments described herein, including the values given for the thickness of the PVF2 material, the width of the strips of piezoelectric material, and the width of the nonconducting gaps between the electrodes, is merely exemplary and that a person skilled in the art may make many variations and modifications to the described embodiments utilizing functionally equivalent elements to those described. In addition, the embodiments described herein are not limited to medical applications, but can be used in industrial applications such as measuring the velocity of oil flowing through a pipeline. Moreover, while one-dimensional structures such as grids or a simple cylindrical structure such as the banded guide wire described above, have been described, extension to two dimensional diffracting structures, such as checkerboard or "bull's eye" structure, is within the scope of the present invention. Any variations or modifications to the invention described hereinabove are intended to be included within the scope of the invention as defined by the appended claims.

What is claimed is:

1. An ultrasonic transducer apparatus, comprising:

at least two adjacent piezoelectric strips of a given polarization, said strips forming a diffracting structure, said diffracting structure being adapted for emitting and receiving a single diffracted ultrasonic beam at a given frequency, wherein each of said strips are defined by a portion of a planar piezoelectric member, said member having two major surfaces opposite one another;

a ground plane disposed on one of said major surfaces of said planar member;

an electrode disposed on each of said strips on a portion of the other one of said major surfaces that defines each strip; and ultrasonic generation means coupled between said electrodes and said ground plane for generating said diffracted ultrasonic beam, wherein said ultrasonic generation means applies a first ultrasound signal to a first one of said strips, and a second ultrasound signal to a second one of said strips adjacent said first one of said strips, said second signal being offset by a predetermined phase angle from said first signal whereby said single ultrasonic diffracted beam is emitted at an angular direction from a plane perpendicular to said other one of said major surfaces of said planar member.

2. The ultrasonic transducer apparatus according to claim 1, further including another piezoelectric strip adjacent to said second one of said strips, said another strip having piezoelectric material of an opposite polarity to piezoelectric material of said second one of said strips, said another strip having an electrode coupled to the electrode on said first one of said strips, wherein said ground plane extends on a surface of said another strip opposite said electrode of said another strip.

3. The ultrasonic transducer apparatus according to claim 2, wherein said predetermined phase angle is 90 degrees, whereby said first one of said strips and said another strip act as grid elements that have an equivalent phase angle.

4. The ultrasonic transducer apparatus according to claim 2 wherein said predetermined phase angle is 180°, whereby two simultaneous diffracted beams are emitted at equal and opposite angles from a plane perpendicular to said other major surface.

5. A method of determining a velocity of a fluid flowing through a lumen, comprising the steps of:

placing a piezoelectric ultrasonic transducer apparatus proximate to said fluid, said ultrasonic transducer apparatus being adapted for emitting a single diffracted ultrasonic beam at a time;

exciting said ultrasonic transducer apparatus to emit a first ultrasonic beam in a first given direction within a first given time interval;

measuring a first Doppler shift frequency of ultrasound energy reflected from said first ultrasonic beam by said fluid;

exciting said ultrasonic transducer apparatus to emit a second ultrasonic beam in a second given direction at a second given time interval;

measuring a second Doppler shift frequency of ultrasound energy reflected from said second ultrasonic beam by said fluid; and determining velocity of said fluid from said measurements of said first and second Doppler shift frequencies.

6. The method according to claim 5 wherein said first ultrasonic beam comprises energy of a first ultrasonic transmitting frequency, and said second ultrasonic beam comprises energy of a second ultrasonic transmitting frequency, said first and second given directions being respective functions of said first and second ultrasonic transmitting frequencies.

7. The method according to claim 5 wherein said first and second ultrasonic beams each comprise energy of a first ultrasonic transmitting frequency, and wherein a change in a phase gradient between elements of said piezoelectric transducer enables said second ultrasonic beam to be emitted in said second given direction.

8. An ultrasonic transducer apparatus for measuring the velocity of a fluid flowing through a lumen, comprising:

an ultrasonic transmitting/receiving transducer having a diffracting structure, said apparatus including pulse generating means for driving said transducer in a first transmission mode to transmit a plurality of ultrasonic beams which are predominantly diffracted, whereby said ultrasonic beams are used by said ultrasonic transducer apparatus to measure the velocity of the fluid.

9. The ultrasonic transducer apparatus according to claim 8, wherein said pulse generating means drives said transducer in a second transmission mode to transmit a plurality of ultrasonic beams which are predominantly non-diffracted.

10. The ultrasonic transducer apparatus according to claim 9, wherein said diffracting structure is oriented in a wave path of said transducer.

11. The ultrasonic transducer apparatus according to claim 9, wherein said pulse generating means includes means for driving said transducer at various selected frequencies in said first and second transmission modes.

12. The ultrasonic transducer apparatus according to claim 9, wherein said diffracting structure is integrally formed with said transducer and includes an array of vibrating elements which alternately vibrate in opposite directions to transmit said diffracted and non-diffracted ultrasonic beams.

13. The ultrasonic transducer apparatus according to claim 12, wherein said array of vibrating elements are fabricated from a piezoelectric material.

* * * * *